Dec. 31, 1957 E. H. HORNE 2,818,534
BONDING APPLIANCE
Filed July 28, 1954 4 Sheets-Sheet 1
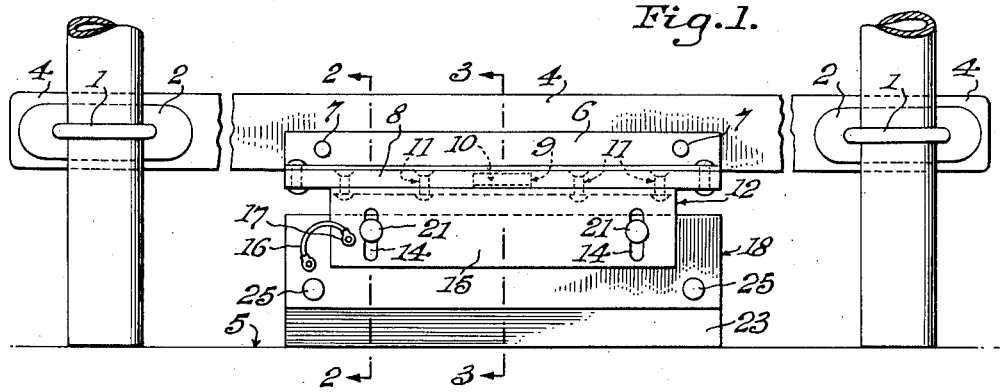
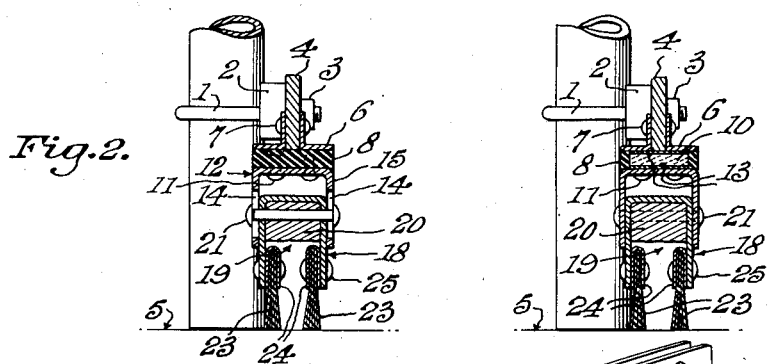
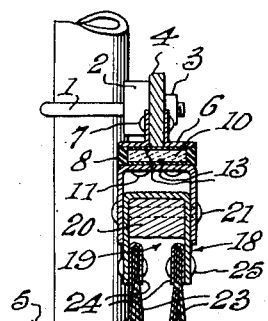
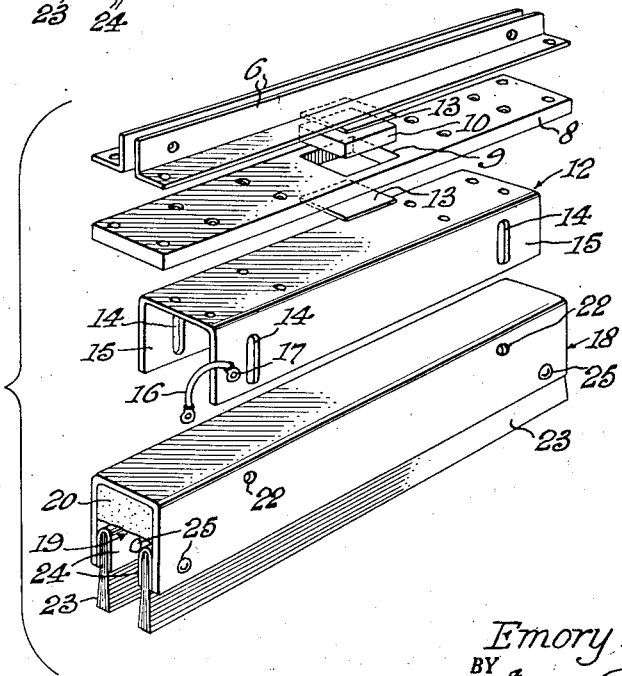
INVENTOR.
Emory H. Horne
BY
ATTORNEYS Dec. 31, 1957     E. H. HORNE     2,818,534
BONDING APPLIANCE
Filed July 28, 1954                                                         4 Sheets-Sheet 2
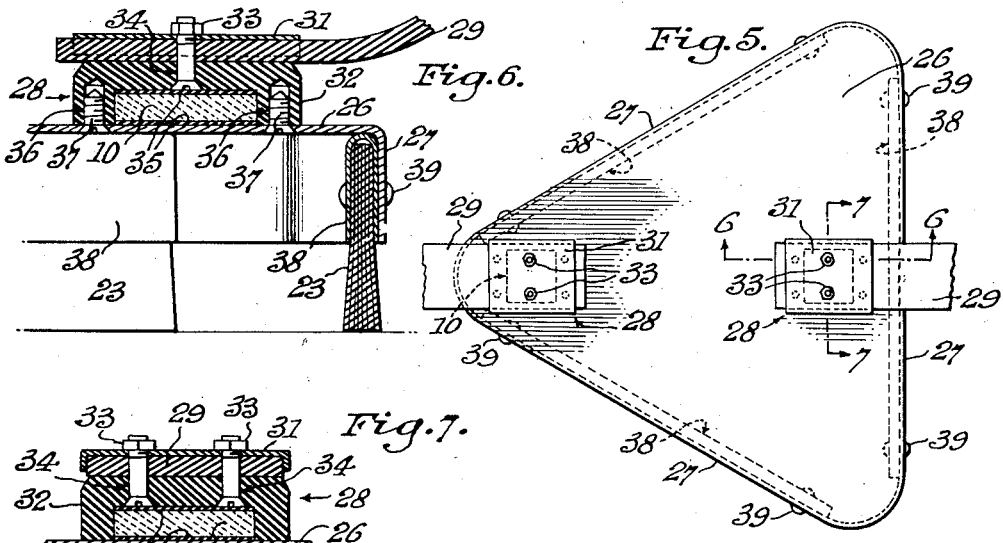
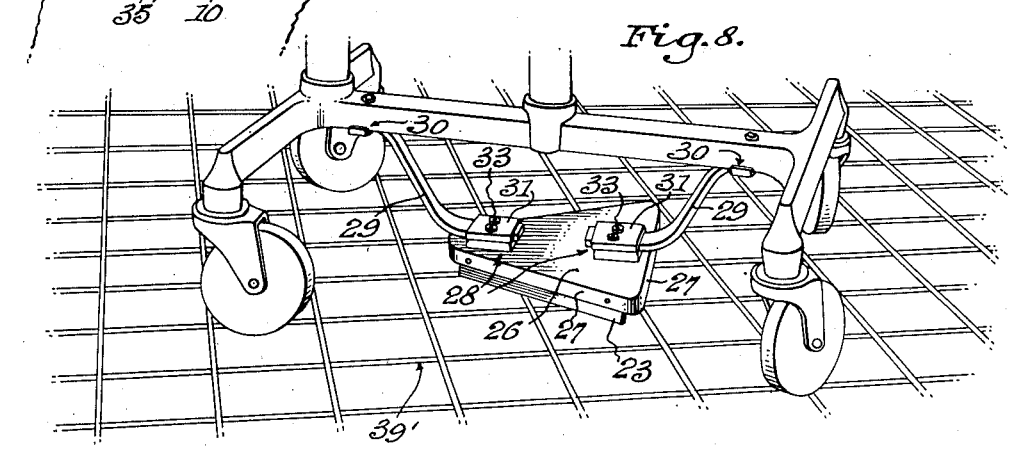
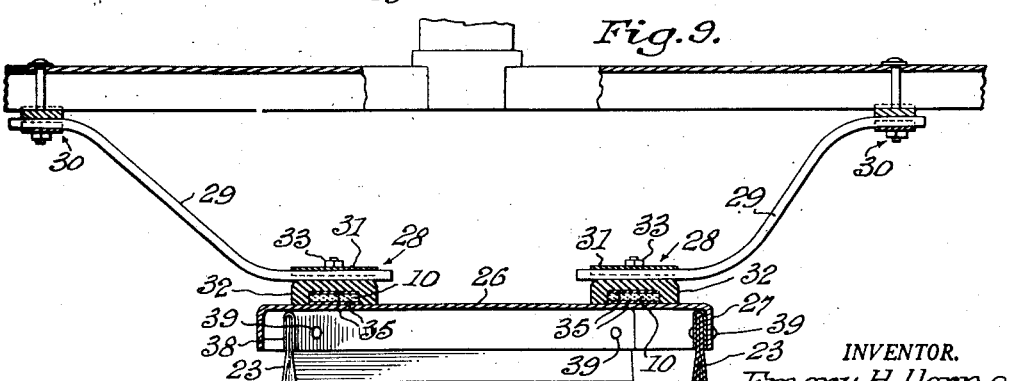
INVENTOR.
Emory H. Horne
BY
ATTORNEYS Dec. 31, 1957  E. H. HORNE  2,818,534
BONDING APPLIANCE
Filed July 28, 1954  4 Sheets-Sheet 3
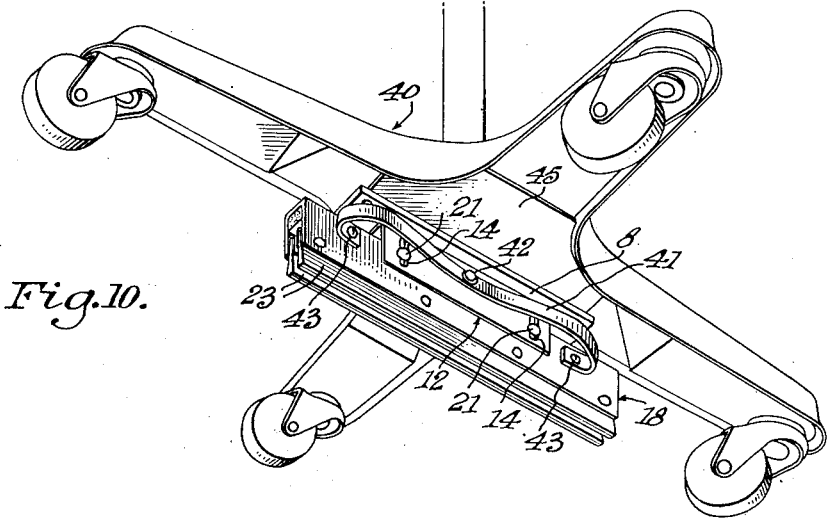
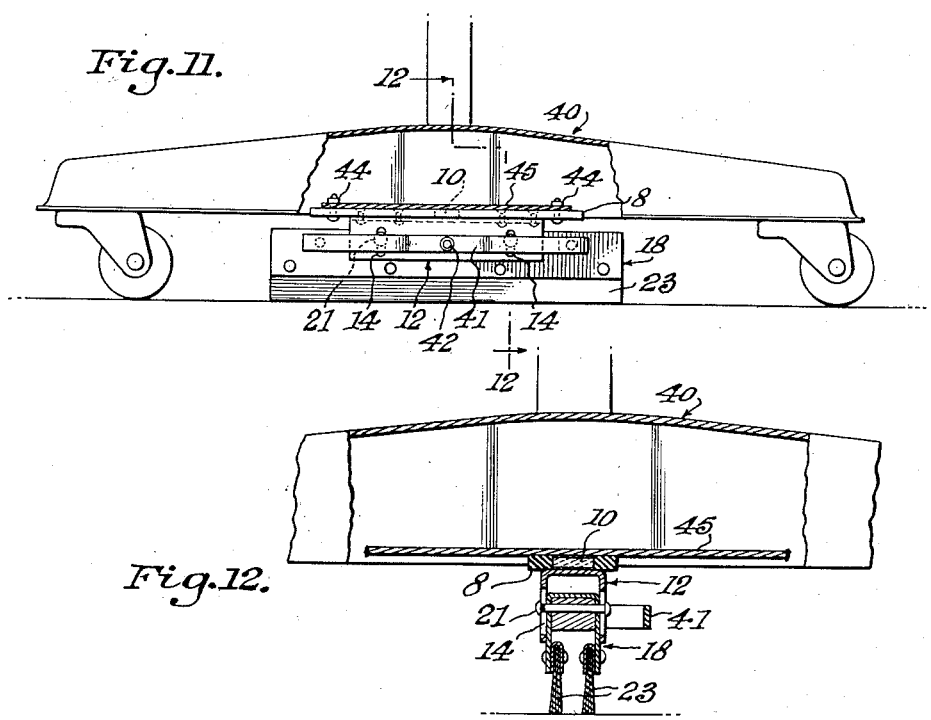
INVENTOR.
Emory H. Horne
BY
ATTORNEYS INVENTOR.
Emory H. Horne

United States Patent Office 2,818,534
Patented Dec. 31, 1957

2,818,534

BONDING APPLIANCE

Emory H. Horne, Richmond, Va., assignor of one-half to John P. Walson

Application July 28, 1954, Serial No. 446,426

10 Claims. (Cl. 317—2)

(Granted under Title 35, U. S. Code (1952), sec. 266)

The invention described herein may be manufactured and used by or for the Government for governmental purposes, without payment to me of any royalty thereon.

The present invention relates to a device for conducting electric energy and more particularly to bonding appliances which not only permit dissipation of elastrostatic charges developed by movement of personnel and equipment, but also for limiting the conduction of electromotive force energy to reduce the hazards of electrical shock to personnel and equipment.

The varying electrostatic potentials of personnel and equipment are merged into a circuit for each source by means of individual bonding appliances and dissipated through a resistor of controlled value in each circuit to a ground which permits equalizing the static potentials in an area, thereby eliminating the possibility of spark discharges from charged to uncharged objects within a particular area.

It is well known that sparks from static electricity cause fires and explosions of combustible gases, vapors, and finely divided particles in suspension in inclosed areas. While the instant invention is intended primarily for application to personnel and equipment in hospital operating rooms, where the anesthetic agents commonly used are gaseous and also flammable and electrostatic sparks and ignition hazards can cause disaster, the principle of the instant invention may also be applied in various industrial installations such as plants for the manufacture and storage of explosives, chemical plants, flour mills, and other establishments wherein the atmosphere may contain volatile or explosive constituents such as powder, dust, fumes, or the like.

Conductive floors are practical means for neutralizing or dissipating electrostatic charges at a rate in excess of the accumulation of charges on personnel or equipment. The prescribed range of resistance for conductive floors, for example, in hospital operating rooms, is less than 1,000,000 ohms at the upper limit and more than 25,000 ohms at the lower limit. These limits are feasible, provided safe resistance limits of the overall conductive circuit can be effectively maintained, and provided further that conductive shoes, casters, and other bonding appliances constituting components of the circuit introduce no hazardous resistance factors. However, tests have shown that many conductive floors such as conductive linoleum, conductive plastic, ceramic tile, etc. do not maintain resistance values over an appreciable period of time under actual operating conditions within a range high enough to satisfactorily prevent hazardous amounts of current flowing which will produce electrical shock, yet of low enough resistance value to provide a good path for dissipating static charges. Metallic grid type floors provide such low resistance floors. However, shock and spark hazards are present where such floors are installed in locations such as anesthetizing areas in hospital operating rooms. The instant invention contemplates resolving this hazard by the interposition of a permanent type resistor of appropriate value in a bonding device between the persons and furnishings, which will invariably provide contact with a conductive floor of the continuous grid type. This solution has proved practical and permits the utilization of grid type floors for dissipating static charges without the introduction of electrical power hazards.

It has been determined that the minimum current which will produce electrical shock in humans is about 1 milliampere. Since the basic intercoupler of the conductive circuit is the floor, for protection against electrical shock it should have a resistance of such value that the combined resistance of person, shoes, and floor will limit the flow of current to approximately 1 milliampere. Commonly used types of conductive flooring materials are such that it is difficult or even inpossible to construct and maintain floors so they will remain within permissible limits.

Methods presently in use for bonding equipment, such as used in hospital operating rooms, to the conductive flooring include metal leg tips, conductive rubber leg tips and casters, metal drag chains and even wet mops or cloths. Personnel use various types of conductive shoes and overshoes as well as conductive soled shoes to effect a conductive path with the floor. Experience has shown that these methods of bonding are not positive in every situation. For example, insulation between the conductive floor and the caster or leg tips sometimes occurs as a result of lint or foreign material on the floor, or the conductive rubber becomes brittle and loses conductiveness. Metal leg tips or conductive leg tips or casters on equipment does not assure contact at all times with the metal divider strips on grid type floors. The links of metal drag chains often bridge over the metal strips in the floor, or the weight of the chain frequently is insufficient to provide electrical contact with either homogeneous conductive floors or grid type floors. Further, the drag chains become either corroded or insulated with foreign matter which prevents a continuous conductive circuit between the equipment and the conductive floor. The use of wet cloths is time consuming, inconvenient, messy, and does not provide a constant resistance value. Conductive rubber tires fail to provide positive contact for electrical bonding to conductive flooring of the homogeneous type because the tires become insulated by dust and foreign material adhering to the treads; also by continuity of the electrical circuit being broken through bearings and loose fittings of the caster into the supporting legs of the equipment. It is obvious that conductive casters will not provide continuous contact with metal strips in grid type floors. Due to variations in weight of equipment, the contact pressure varies, thereby causing a variable resistance between the equipment and the conductive floor.

Conductive footwear conventionally used depends for conductivity and resistance on the shoe material. It has been determined that the resistance, when conductive shoes are used, should not exceed 1,000,000 ohms (1 megohm). Conventional type conductive shoes have been found to have resistances as low as 5000 ohms. Such low values are hazardous to personnel in the event contact is made with electrical power sources. Variations in resistance of conductive rubber shoes are due in part to the compression of the conductive rubber imposed by the weight of the wearer. Increasing the contact pressure lowers the resistance thereby increasing the conductivity of the resilient conductive rubber soles. In order, therefore, that a conductive shoe shall be effective, it is necessary that, when used in conjunction with conductive floors such as the grid type, the upper limit of resistance be controlled in order that not only static charges may be dissipated but at the same time the liability of electrical shock to personnel may be reduced.

In view of the fact that conductive floors vary in resistance due to contact area, pressure, porosity of materials, application of surface moisture, evaporation or recovery time in relation to humidity and that bonding devices, including conductive shoes, possess the various deficiencies as previously noted, the need for an improved form of bonding device for personnel and equipment in hazardous areas such as hospital operating rooms is evident.

It is accordingly a principal object of the instant invention, while permitting the continued use of the conventional more practical grid type conductive floor, to provide a structure for bonding devices which insures continued effective contact with the conducting floor and maintaining resistance values in the conductive circuit within required limits by the inclusion of fixed resistors which not only permit dissipation of static charges but also protect personnel and equipment from hazardous shocks from power sources in the area.

It is also an object of the instant invention to provide a principle for constructing bonding devices which may be applied to both equipment and personnel.

It is a further object of the instant invention to provide a bonding device to permit merging the varying potentials of personnel and equipment into a circuit for each and dissipating the charges through a current limiting device of controlled capacity.

It is a further object of the instant invention to provide a bonding appliance of fixed contact area and capable of maintaining constant contact pressure with a conducting medium.

It is another object of the instant invention to provide a bonding device which is a simple mechanical structure and which may be adapted to various types of equipment.

It is also an object of the instant invention to provide a structure for a bonding appliance for personnel which will maintain a constant resistance value to permit dissipating electrostatic charges yet protect against electrical shocks from power sources.

It is a further object of the instant invention to provide a bonding device which may be used equally effectively with all types of conductive flooring including the metallic grid type.

Other objects and advantages of the invention will be apparent as the description proceeds and by reference to the drawings, in which:

Fig. 1 is an elevational view of one embodiment of the invention showing one form for mounting on equipment having vertical supports to permit maintaining contact with a conducting surface;

Fig. 2 is a detailed vertical sectional view taken on the line 2—2 of Fig. 1 illustrating the manner of obtaining adjustability of the contact portion with the conducting surface;

Fig. 3 is a detailed vertical sectional view taken on the line 3—3 of Fig. 1 showing the manner of mounting the resistor element;

Fig. 4 is an exploded view of the elements comprising the form of the invention illustrated in Fig. 1 but omitting the mounting assembly;

Fig. 5 is a plan view of another embodiment of a bonding device incorporating the structural principles of the instant invention;

Fig. 6 is a detailed vertical sectional view taken on the line 6—6 of Fig. 5 showing details of the connector assembly and brush mounting;

Fig. 7 is a detailed vertical sectional view taken on the line 7—7 of Fig. 5;

Fig. 8 is a perspective view showing the method of attachment of the bonding device as in Fig. 5 to a base for portable equipment;

Fig. 9 is a longitudinal sectional view of the embodiment shown in Fig. 8;

Fig. 10 is a view showing the manner of attaching one embodiment of the instant invention to a pedestal type support for portable equipment;

Fig. 11 is a partial vertical sectional view showing mounting details for the embodiment illustrated in Fig. 10;

Fig. 12 is a vertical sectional view taken on the line 12—12 of Fig. 11;

Figure 13:
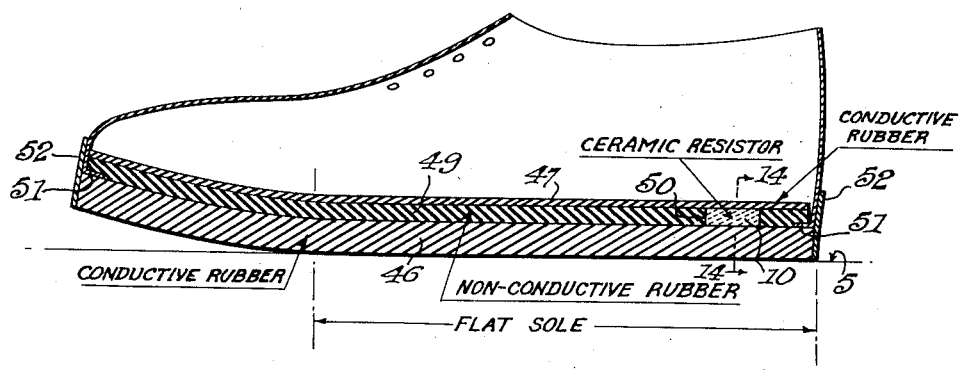
Fig. 13 is a longitudinal sectional view of a conductive shoe embodying the structural principles of the instant invention.
Figure 14:
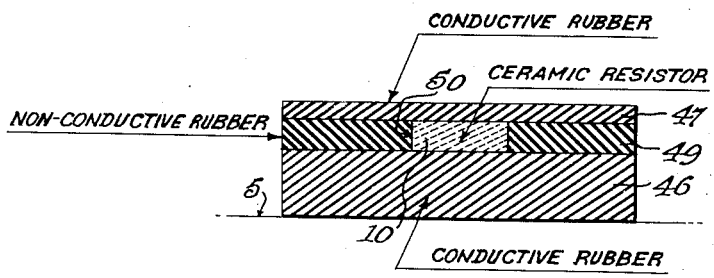
Fig. 14 is a vertical sectional view taken on the line 14—14 of Fig. 13.

The principle of the bonding appliance of the instant invention differs from previous methods of bonding equipment to conductive surfaces in that permanent type resistors are incorporated which will not vary in value in spite of moisture, corrosion, and the collection of foreign material on the contact surfaces of the bonding device. The contact blades of the bonding devices adapted for use on equipment are of such length as to insure at least two points of contact when used with metallic grid type conductive flooring. Contact by the conductive blades is assured by weighting to maintain a constant pressure of one pound per square inch for a continuous unvarying electrical path between the equipment and the conductive surface at all times.

The instant invention embodies a principle, when used in conjunction with a grid type conductive floor, similar to the carbon brush assembly of an electric motor. The metal grid system imbedded in the floor simulates the commutator of the armature or rotor of the motor.

The term bonding appliance as herein used is to be interpreted as applying to the entire structure which serves as an electrical conductor of novel construction permitting the dissipation of electrostatic charges accumulated by motion of equipment and personnel but preventing the conduction of electromotive force energy by the incorporation in the structure of an electrical energy limiting device which preferably is a resistor but conceivably could be other forms of electrical energy limiting devices.

In this respect the bonding appliance of the instant invention differs from bonding devices or conductors as conventionally known since such prior devices are not selective in the conduction of electrical energy but conduct equally as well regardless of the direction of flow of energy. As a matter of fact, prior devices have as a chief function the insurance of conducting electrical energy in either direction between portions of an electrical circuit which are physically separated.

Reference is now made to Fig. 1 of the drawing wherein is shown an embodiment of the instant invention which may be attached, for example, to the legs of chairs, tables or other vertically arranged supporting structure by means of the U-bolts 1, reinforcing clamp 2, and nut 3. A bar 4, which may be of aluminum or other electrical conducting material, is carried by the U-bolt assembly and supports the bonding device at a desired height to maintain satisfactory contact with the electrical conducting surface 5. The bonding device is secured to the bar 4 by means of angle members 6, one leg of which is riveted or otherwise secured in conductive contact thereto by fastening means 7 and the other leg is similarly secured to a mounting plate 8 of fiberboard or other non-conductive material so that the latter is arranged normal to the bar 4.

The mounting place 8 has a central cut-out portion 9 to receive a hermetically sealed ceramic resistor 10. The sealing prevents moisture from affecting the resistance value. As previously explained, this resistor, which is of the order of 250,000 ohms, is used in the bonding appliances of the instant invention in order to limit the effects of accidental electrical power contacts to approximately the perception point. For example, when interposed in the conductive circuit between the equipment and conductive floor, the resistor limits flow of current at 120 volts to approximately 1.0 milliampere which is essential to reduce the hazard of electrical shock and at the same time adequately facilitates the dissipation of static charges.

If desirable, conductive rubber pieces or shims 13, as in Figs. 3 and 4, of comparable area to the ceramic resistor contacting faces, may be placed on the top and bottom face of the ceramic resistor to insure effective contact between the variable connector 12 and the particular piece of equipment.

In certain instances it may be more convenient to attach the bonding device as in Fig. 1 directly to the equipment without benefit of the U-bolt and angle mounting assembly, for example, as in Fig. 12.

Attached to the mounting plate 8 by rivets 11 or otherwise is an elongated U-shaped variable connuector 12 made of 16 gage stainless steel or comparable electrically conductive material. Slotted holes 14 are provided in the depending portions 15 of the U-shaped variable connector 12 for a purpose to be hereinafter described. A flexible shunt 16 of copper wire or the like is secured in any convenient manner as at 17 to the U-shaped variable connector 12 for electrically connecting the elongated brush holder 18 to the variable connector 12 to eliminate the possibility of a break in the conductive circuit between the equipment and the conducting surface 5.

The brush holder 18 is also a U-shaped member made of 16 gage stainless steel or similar electrically conductive material of such dimensions to permit telescopic or sliding fit within the U-shaped variable connector 12. A reservoir 19 is provided in the brush holder 18 for poured lead 20 or other material for additional weight to insure proper contact with the conducting surface. The amount of material, poured lead 20 or otherwise, should be sufficient to cause a pressure of about one pound per square inch of brush surface in contact with the conducting surface 5. Stationary bolts 21 or comparable means pass through passages in the poured lead 20 in the brush holder 18, which passages terminate in apertures 22 in the brush holder 18. The bolts 21 are of sufficient length to permit free sliding fit in the elongated slots 14 in the variable connector 12 thereby permitting the brushes 23 to adjust themselves to irregular conducting surface contours and provide unrestricted movement of the brushes 23 to exert pressure against the conducting surface 5. The brushes 23 are secured in U-shaped members 24 and in turn to the brush holder 18 by rivets 25 or other fastening means.

The brushes 23 are made of low resistance rubber sheeting material comprising an acetylene carbon mixture of rubber vulcanized to fabric. The thickness of the rubber sheeting varies from 0.015" to 0.018". It has been determined that brushes made of six strips or plies of the conductive material in parallel arrangement, each strip measuring 1 inch wide by 5¾ inches long, are required, for example, for use on a grid type floor having conductive strips on 4 x 4 inch squares or less to provide continuous electrical contact when pressure is applied through weight of poured lead 20 or otherwise, to exert a pressure of one pound per square inch of brush contact area with the conducting surfaces. The brushes are constructed so that reversal in the direction of movement of the equipment will also reverse the inclination of the rubber strips, similar to the operation of a windshield wiper. This action has the effect of keeping the brushes clean as well as facilitating uniform wear of the rubber. The frictional resistance or abrasiveness of the floors is sufficient under normal operating conditions to keep the contact surfaces of the rubber free of extraneous and oxidized material and still not cause excessive wear. Brushes for larger grid spacings will, of course, have to be proportionately longer, for example, for 6 x 6 inch spacing of grids, the brushes should be 8¾ inches long and the weight of lead 20, or otherwise, increased to cause a pressure of one pound per square inch to be applied by the brushes 23 against the conducting surface 5.

The bonding device shown in Fig. 1 may be modified in configuration and structure to be adaptable to various types of equipment. The modification shown in Fig. 8, while it may be attached to various types of portable equipment, is particularly adapted to wheeled litters. The principle of operation is similar to the device of Fig. 1 with the exception that the vertical adjustment of the brushes is accomplished in a different manner to be hereinafter described.

A triangularly shaped base 26 having a flanged periphery 27, which base may be made of 20 gage drawn stainless steel or ⅛ inch thick German silver casting or comparable material, carries a brush 23 on the interior surface of each of the sides of the peripheral portion 27 and is connected to the equipment by means of the resistor assembly shown generally at 28 and the static strips 29 of conductive rubber of appropriate length.

The static strips are secured in electrical conductive contact with the equipment in any convenient manner, for example, as shown generally at 30. The other end of the static strips, which could be more than two as illustrated depending on the equipment and configuration of the base 26, is attached in electrically conductive contact with the resistor assembly 28 between the clamp 31 and the resistor holder 32 by means of a nut and bolt assembly 33.

The resistor holder 32 of electrical insulating material may be a cast or molded one-piece structure of plastic or similar material, such as styrene plastic. The resistor holder 32 is provided with openings 34 to accommodate the nut and bolt assembly 33 for making contact between the static strips 29 and the conductive rubber shim 35 in face contact with the ceramic resistor 10 and threaded recesses 36 to receive fastening means 37 by which the resistor assembly is secured in electrically conductive contact to the base 26.

The brushes 23 are secured to the peripheral portion 27 of the base 26 by clamps 38, which may be made of 24 gage stainless steel or similar material, and rivets 39 or other securing means which pass through the holders 38 and brushes 23. When secured in operating position as shown in Fig. 8, the weight of the bonding device and the flexibility of the static strips 29 permit exertion of sufficient pressure to insure maintaining proper continuous contact with the conductive surface, which may be a grid type floor 39' to effectively dissipate static charges accumulated by movement of the equipment.

The resistors 10 serve the same function in this arrangement, that is, to protect the equipment as well as personnel coming in contact with the equipment from electrical power shocks.

Fig. 10 shows a bonding device in accordance with the instant invention which is adapted for use with a pedestal type base 40 for portable equipment. This modification is similar to that illustrated in Fig. 1 with the exception of the conductive strip 41 which insures electrical contact between the brush holder and the variable connector by bonding these latter elements as at 42 and 43 by riveting, bolting, or otherwise.

The manner of securing this bonding device to the pedestal type base 40 is shown in Figs. 11 and 12 and is accomplished by fastening the mounting plate 8 which is of insulating material, by rivets 44 or otherwise to the base plate 45 located underneath the pedestal type support.

Electrical contact with the bonding device is obtained through the ceramic resistor 10 which may have conductive rubber shims in contact with each of the contacting faces of the ceramic resistor similar to the embodiment shown in Fig. 4.

Adjustability of the brushes 23 to irregularities of the conducting surface 5 is obtained as in embodiment in Fig. 4 by sliding motion of the bolts 21 in the slotted holes 14 which permits relative vertical motion between the variable connector 12 and the brush holder 18.

The principles applied to the bonding devices for equipment may be applied to conductive footwear for personnel in hazardous areas. As in the bonding devices, the shoe differs from previous types of conductive footwear in that a permanent type of resistor is hermetically sealed into the shoe to prevent resistance variations caused by moisture and foreign material. It is not necessary therefore, to depend on the conductivity and resistance of the shoe material.

As shown in Fig. 13, which is one embodiment of the instant invention applied to conductive footwear, the conductive rubber sole 46 is constructed so that the entire flat sole contacts the conducting surface 5 to assure contact with the conductive strips of grid type floors. In use, the wearer's foot contacts the low resistance conductive rubber inner sole 47 which is insulated from the outer low resistance conductive rubber sole 46 by a middle sole 49. The middle sole 49 is provided with a cut out portion 50 in the vicinity of the heel of the shoe to receive a ceramic resistor 10 of equal thickness with the middle non-conductive sole 49.

The ceramic resistor 10 is bonded in any convenient manner by conductive material such as conductive adhesive at the upper and lower faces of the resistor in such a manner to insure non-conductivity around the edges of the resistor. For satisfactory operation to permit dissipation of static charges and yet prevent personnel from receiving electric power shocks, the resistor should have a value of not more than 250,000 ohms.

The upper portion of the shoe, which may be made of canvas, is joined to the sole portion of the shoe by lapping the joining edge as at 51 under the middle sole 49 all around and sealing with non-conductive cement. The sealed joint is covered with a strip 52 of non-conductive rubber.

Each of the wearer's shoes is constructed in a similar manner which provides a pair of shoes by means of which a resistance of 550,000 to 600,000 ohms may be maintained depending upon the resistance of the wearer. These latter values are well within the upper limit of 1,000,000 ohms, previously explained.

The invention is not to be limited to the exact embodiments described herein as various changes in the details of construction may be resorted to without departing from the spirit of the invention.

Having thus described my invention, what I claim as new and desire to secure by United States Letters Patent is:

1. A bonding device for conducting electrical energy comprising, in combination, rigid electrical conducting means, clamping means secured to said rigid conducting means and capable of being secured to a source of electrical energy, insulating means contacting said rigid conducting means and provided with an aperture, electrical energy limiting means of constant predetermined value mounted in said aperture and contacting said rigid electrical conducting means, flexible electrical conducting means, mounting means for said flexible conducting means including first and second channel members, said first channel member arranged in base to base nesting relation with said second channel member, means connecting said first and second channel members for relative vertical motion of said channel members, said first channel member being weighted, said flexible electrical conducting means secured to said second channel member, flexible electrical connector means joining said first and second channel members, said flexible electrical conductor means being maintained in wiping contact with a conducting surface by said weighted channel member whereby electrical energy in the form of electrostatic charges is conducted by said clamping means through said electrical energy limiting means, said first and second channels, said flexible electrical conducting means to a charge deficient conducting surface, said electrical energy limiting means preventing conduction of electromotive force in excess of a predetermined amount through said rigid conducting means to said clamping means.

2. A device as in claim 1 wherein said flexible electrical conducting means includes a plurality of strips of conductive rubber in registering relation.

3. A device as recited in claim 1 wherein a resistor element constitutes said electrical energy limiting means.

4. A bonding device for conducting electrical energy comprising, in combination, an electrically conducting base member comprising a planar portion and a flanged peripheral portion integral therewith, connector means secured in electrically contacting relation to a surface of said planar portion of said base member remote from said flanged portion, said connector means adapted to receive a flexible support means joining said connector means to a potential source of electrical energy, flexible conducting means carried by said flanged peripheral portion and in electrical contact therewith, electrical energy limiting means of constant predetermined value mounted in said connector means and providing a restricted conducting path between said flexible support means and said flexible conducting means whereby electrical energy in the form of electrostatic charges conducted by said flexible support means is permitted to flow through said electrical energy limiting means and said flexible conducting means to a conducting surface but preventing conduction of electromotive force in excess of a predetermined amount through said flexible support means.

5. A device as recited in claim 4 wherein said connector means comprises a clamping member, insulating means of comparable configuration with said clamping member having a recess formed therein in a surface portion thereof in face relation with said planar portion of said base member, said recess adapted to receive said electrical energy limiting means, electrically conducting plates arranged in contacting relation with said electrical energy limiting means, fastening means for compressing said clamping means and said insulating means in registering relation whereby upon insertion of a free end of said flexible support means between said clamping member and a surface of said insulating means remote from said recess electrical contact is established between said flexible support means and said base member through said fastening means, said contacting plates and said electrical energy limiting means.

6. A device as recited in claim 4 wherein said flexible support means is composed of conductive rubber.

7. A device as recited in claim 4 wherein said flexible conducting means includes a plurality of strips of conductive rubber in registering relation.

8. A device for conducting electrical energy comprising, in combination, flexible electrical conducting elements, mounting means for said elements including a plurality of elongated nesting electrically interconnected members relatively, continuously, vertically adjustable, said elements projecting beyond the lowermost of said nesting members, support means for said nesting members, insulating means separating said support means and said nesting members, electrical energy controlling means mounted in said insulating means and electrically connecting said nesting members to said support means whereby electrical energy may be conducted between said conducting elements and said support means.

9. A device for conducting electrical energy comprising, in combination, a plurality of flexible, electrical conducting, juxtaposed strips, mounting means for maintaining said strips in vertical position including a pair of elongated, nesting, electrically interconnected members relatively, continuously, vertically adjustable, said strips projecting beyond the lowermost of said nesting members and coextensive therewith, support means for said nesting members, insulating means interposed between said support means and said nesting members, electrical energy controlling means mounted in said insulating means in electrical contacting relation with said nesting members and said support means whereby an electrically conductive path is established between said juxtaposed strips and said support means.

10. A device for conducting electrical energy comprising, in combination, a plurality of flexible, electrically conducting juxtaposed strips, mounting means for maintaining said strips in vertical position including a pair of elongated, nesting, electrically interconnected members relatively, continuously, vertically adjustable, said strips projecting beyond the lowermost of said nesting members and coextensive therewith, support means for said nesting members, insulating means having an aperture therein interposed between said support means and said nesting members, electrical energy limiting means of predetermined constant value hermetically sealed in said aperture and in electrical contact with said nesting members and said support means whereby a restricted conductive path is provided between said flexible strips and said support means permitting dissipation of electrostatic charges conducted to said support means by said mounting means to a charge deficient conducting surface and preventing the conduction of electromotive force in excess of a predetermined amount to said support means.

References Cited in the file of this patent

UNITED STATES PATENTS

| | | |
|---|---|---|
| 1,545,672 | McArthur | July 14, 1925 |
| 2,047,838 | Smith | July 14, 1936 |
| 2,136,555 | Loftis | Nov. 15, 1938 |
| 2,279,094 | Siers | Apr. 7, 1942 |
| 2,325,414 | McChesney | July 27, 1943 |
| 2,526,908 | Selhast | Oct. 24, 1950 |
| 2,586,747 | Van Atta | Feb. 19, 1952 |
| 2,686,891 | Burgin | Aug. 17, 1954 |
| 2,732,517 | Alabaster | Jan. 24, 1956 |

UNITED STATES PATENT OFFICE

CERTIFICATE OF CORRECTION

Patent No. 2,818,534 December 31, 1957

Emory H. Horne

It is hereby certified that error appears in the above numbered patent requiring correction and that the said Letters Patent should read as corrected below.

In the grant, lines 2 and 11, and in the heading to the printed specification, line 4, name of the assignee of one-half interest, for "John P. Walson", each occurrence, read -- John P. Watson --.

Signed and sealed this 1st day of April 1958.

(SEAL)
Attest:

KARL H. AXLINE

Attesting Officer

ROBERT C. WATSON
Commissioner of Patents